United States Patent
Averkiou

(10) Patent No.: US 6,544,182 B2
(45) Date of Patent: Apr. 8, 2003

(54) ULTRASONIC NONLINEAR IMAGING AT FUNDAMENTAL FREQUENCIES

(75) Inventor: Michalakis Averkiou, Kirkland, WA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/989,668

(22) Filed: Nov. 20, 2001

(65) Prior Publication Data

US 2002/0032382 A1 Mar. 14, 2002

Related U.S. Application Data

(62) Division of application No. 09/627,918, filed on Jul. 28, 2000, now Pat. No. 6,319,203.

(51) Int. Cl.[7] .................................. A61B 8/00
(52) U.S. Cl. ........................ 600/455; 600/458
(58) Field of Search ..................... 600/444, 443, 600/447, 448, 449, 455, 456, 437

(56) References Cited

U.S. PATENT DOCUMENTS

| | | | |
|---|---|---|---|
| 4,012,950 A | 3/1977 | Kompfner et al. | |
| 4,028,933 A | 6/1977 | Lemons et al. | |
| 4,430,897 A | 2/1984 | Quate | |
| 4,960,329 A | 10/1990 | Schofield | |
| 5,526,816 A | 6/1996 | Arditi | |
| 5,577,505 A | 11/1996 | Brock-Fisher et al. | |
| 5,601,086 A | 2/1997 | Pretlow, III et al. | |
| 5,632,277 A | 5/1997 | Chapman et al. | |
| 5,694,937 A | 12/1997 | Kamiyama | |
| 5,706,819 A | 1/1998 | Hwang et al. | |
| 5,724,976 A | 3/1998 | Mine et al. | |
| 5,735,281 A | 4/1998 | Rafter et al. | |
| 5,833,613 A | 11/1998 | Averkiou et al. | |
| 5,848,968 A | 12/1998 | Takeuchi | |
| 5,873,829 A | 2/1999 | Kamiyama et al. | |
| 5,879,303 A | 3/1999 | Averkiou et al. | |
| 5,889,870 A | 3/1999 | Norris | |
| 5,903,516 A | 5/1999 | Greenleaf et al. | |
| 6,117,082 A | 9/2000 | Bradley et al. | |
| 6,185,949 B1 | 2/2001 | Hatfield et al. | |
| 6,251,074 B1 * | 6/2001 | Averkiou et al. | 600/447 |
| 6,371,917 B1 * | 4/2002 | Ferrara et al. | 600/458 |
| 6,436,041 B1 * | 8/2002 | Phillips et al. | 600/437 |
| 6,438,258 B1 * | 8/2002 | Brock-Fisher et al. | 600/443 |

* cited by examiner

Primary Examiner—Marvin M. Lateef
Assistant Examiner—Maulin Patel
(74) Attorney, Agent, or Firm—W. Brinton Yorks, Jr.

(57) ABSTRACT

Nonlinear tissue or contrast agent effects are detected by combining echoes from multiple, differently modulated transmit pulses below the second harmonic band. The received echoes may even overlap the fundamental transmit frequency band. The modulation may be amplitude modulation or phase or polarity modulation, and is preferably both amplitude and phase or modulation. The present invention affords the ability to utilize a majority of the transducer passband for both transmission and reception, and to transmit pulses which are less destructive to microbubble contrast agents.

15 Claims, 5 Drawing Sheets

ULTRASONIC NONLINEAR IMAGING AT FUNDAMENTAL FREQUENCIES

This is a divisional application of U.S. patent application Ser. No. 09/627,918, filed Jul. 28, 2000 now U.S. Pat. No. 6,319,203.

This invention relates to ultrasonic diagnostic imaging systems and, in particular, to ultrasonic diagnostic imaging systems which image nonlinear signals in the fundamental frequency band.

U.S. Pat. No. 5,879,303, of which I am a co-inventor, describes methods and apparatus for doing harmonic ultrasound imaging. As explained in my patent, an ultrasonic wave can be transmitted at a fundamental frequency to give rise to harmonic echo signals, in particular at the second harmonic, from two distinct sources. One is the nonlinear behavior of microbubble contrast agents. When these microbubble agents are insonified by the transmit wave, they will oscillate or resonate nonlinearly, returning a spectrum of echo signals including those at the second harmonic of the transmit frequency. The strong harmonic echo components uniquely distinguish echoes returning from the microbubbles, which can be used to form B mode or Doppler images of the bloodflow infused by the contrast agent. The other source of harmonic echo signals is the nonlinear distortion which ultrasonic waves undergo as they travel through tissue. The echoes returned from these distorted waves manifest harmonic components developed by this distortion.

My aforementioned U.S. patent describes two ways in which the harmonic components of these echo signals may be detected. One is by use of a highpass filter, which will pass signals in the harmonic band while attenuating the stronger echo components in the fundamental band. The other way is by transmitting two or more pulses of opposite phase or polarity and combining the echoes received in response from the two pulses. The fundamental components, being of opposite phase or polarity by reason of that characteristic of the transmit pulses, will cancel. The harmonic components of the combined echoes, being quadratic in nature, will additively combine, leaving the separated second harmonic signals.

As discussed in my aforementioned patent, harmonic signals are advantageous in many imaging situations because of the distinctive way in which they identify echoes returned from harmonic contrast agents. When used without contrast agents the tissue harmonic signals are advantageous because their development within the body eliminates much of the clutter caused by nearfield effects. However, harmonic signals are of a significantly lower amplitude than the fundamental signal echoes, providing lower signal to noise ratios and requiring greater amplification. In addition, harmonic signals require the use of relatively low frequency transmit pulses so that the second harmonic echo signal will be of a frequency which can be received within the transducer's passband. Generally, the transmit signal will be centered at the lower end of the transducer's passband so that the second harmonic return signal will be below the upper cutoff of the transducer passband. This can place the transmit and receive signals at the extremes where broadband signals will experience attenuating rolloff. It also mandates lower frequency transmit signals, which can be more disruptive to microbubble contrast agents than higher transmit frequencies would be. Accordingly it is desirable to be able to overcome these deficiencies and limitations of harmonic imaging.

In accordance with the principles of the present invention, the nonlinear signals returned from tissue and contrast agents are detected in the fundamental frequency band rather than at harmonic frequencies. In a preferred embodiment the nonlinear signals are detected by an amplitude modulated two (or more) pulse technique. Preferably the transmit pulse waveforms are of opposite phase and polarity and of different amplitudes. Upon reception the echoes are normalized for the different transmit amplitudes and combined and the signals within the fundamental band are used for imaging.

Figure 1:
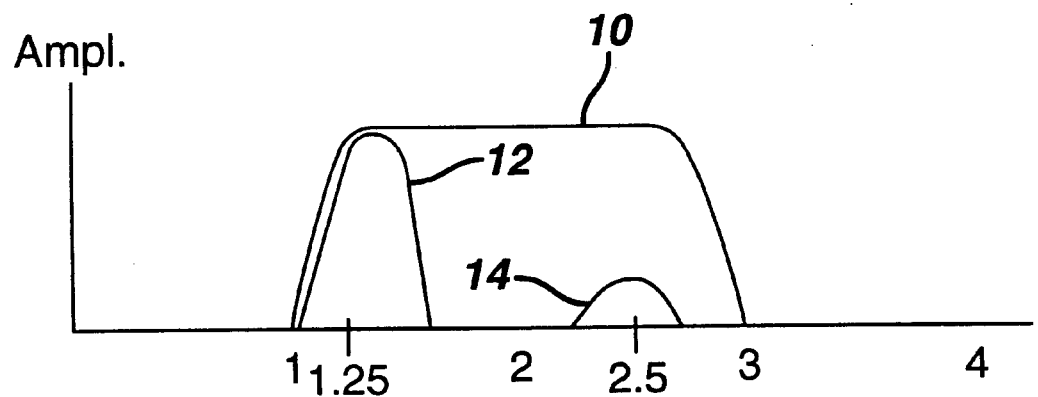
FIG. 1 illustrates conventional transmit and harmonic receive spectra within a transducer passband.

Referring first to FIG. 1, typical fundamental and harmonic spectra of an ultrasound system are shown. This drawing illustrates a passband 10 of an ultrasonic transducer/beamformer which transmits the fundamental frequency pulses or waves, and receives the harmonic echo signals. In this example the transducer has a passband extending from 1 to 3 MHz. When the same transducer is to be used for both transmission and reception, both the fundamental transmit pulse and the harmonic receive echoes must be encompassed within the passband 10 of the transducer. In this example the transmit pulse exhibits a passband 12 which is centered around 1.25 MHz. Second harmonic echo signals will be received in a passband 14 centered around 2.5 MHz. It is seen that because the transmit band 12 is at the lower end of the transducer passband 10, the harmonic receive passband will fall in the upper portion of the passband 10 and thus both transmission and reception can be performed by this particular transducer.

Figure 2:
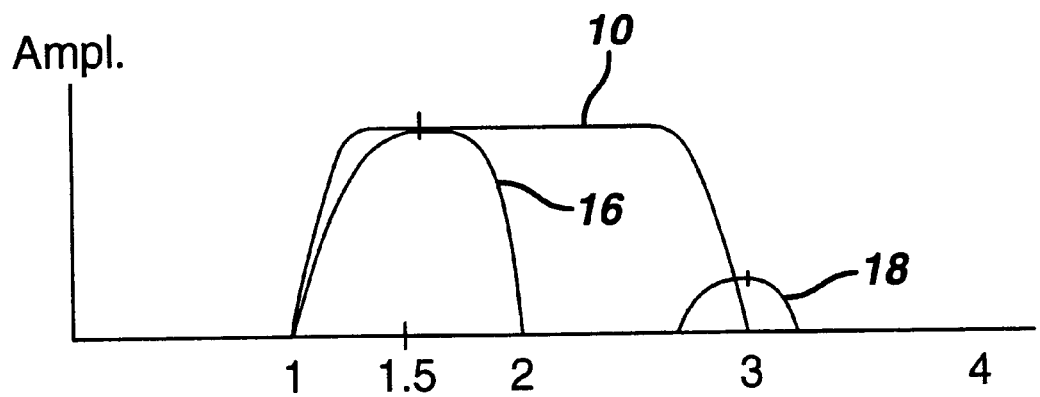
FIG. 2 illustrates the location of a harmonic spectrum at the upper limit of the transducer passband.

As FIG. 1 shows, in order to get both the fundamental band 12 and the harmonic band 14 within the same transducer passband it is often necessary to fit one or the other or both of the transmit or receive passbands at one of the cutoff extremes of the transducer passband. FIG. 2 shows another example of this, in which the fundamental transmit band 16 is centered about a frequency of 1.5 MHz and occupies the entire lower half of the transducer passband 10. The transmit band 16 thus is for a more broadband transmit signal than that which is transmitted by the passband 12 in FIG. 1, providing improved image detail and quality. However the second harmonic receive passband 18 for this transmit pulse is centered at 3 MHz at the upper extreme of the transducer passband 10. In this example the center of the harmonic band is at the upper cutoff of the transducer band, resulting in significant attenuation of signals in the upper portion of the band 18. Thus, broadband harmonic imaging is limited by this transducer passband.

Figure 3:
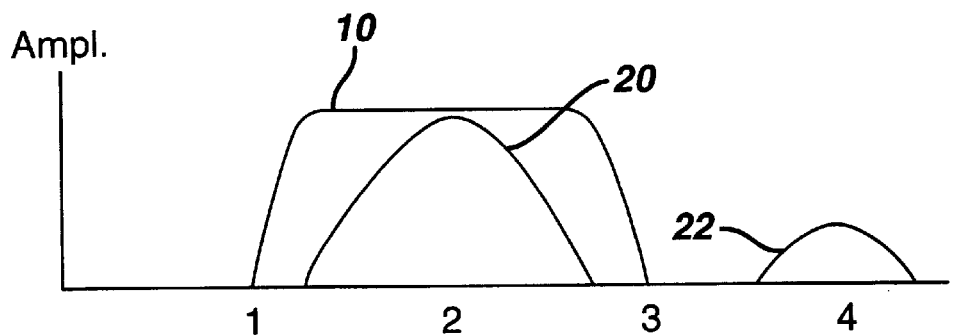
FIG. 3 illustrates the fundamental transmit and second harmonic receive spectra of an embodiment of the present invention.
Figure 4:
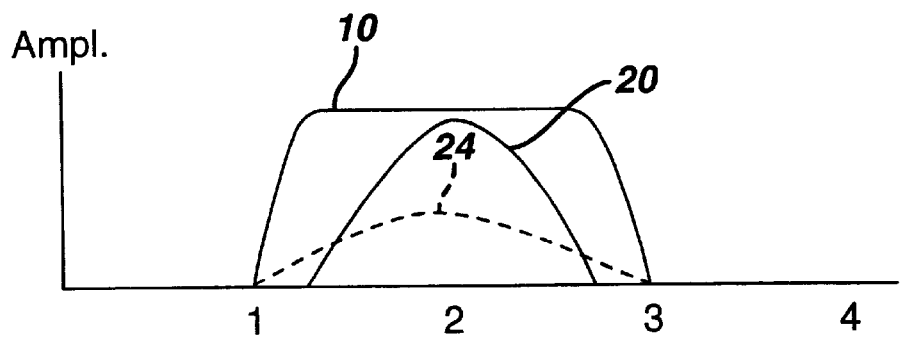
FIG. 4 illustrates the spectrum of fundamental nonlinear echo signals resulting from the transmit spectrum of FIG. 3.
Figure 5:
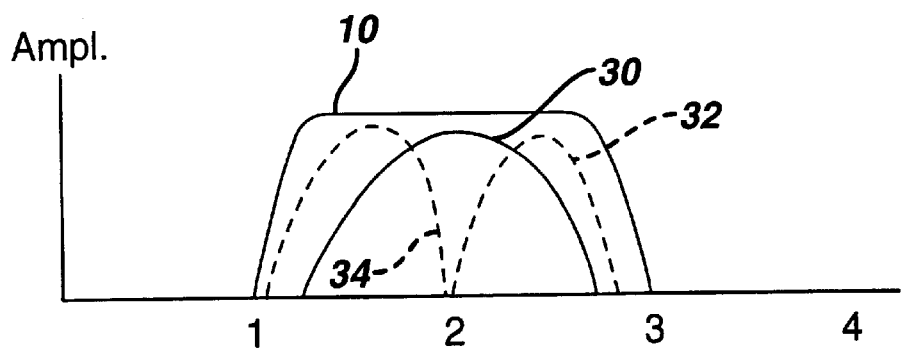
FIG. 5 illustrates receive passbands for the nonlinear echo signals of FIG. 4.

The passbands used in a first embodiment of the present invention is shown in FIGS. 3–5 using the same transducer passband 10 as in the previous drawings. Two or more differently modulated broadband transmit pulses having a passband 20 are transmitted along each scanline in the image field as shown in FIG. 3. As this drawing shows, the fundamental transmit pulses centered at 2 MHz will elicit second harmonic echo signals in a band 22 centered at 4 MHz. These harmonic echo frequencies are outside the transducer passband 10 and hence will be beyond the frequency range of the transducer. However the transmit pulses will also elicit echoes in the fundamental frequency band 20 and beyond, as shown by the dashed line receive passband 24 in FIG. 4. As will be discussed below, these fundamental frequencies can exhibit varying degrees of linear and nonlinear characteristics depending upon the presence of nonlinear reflectors such as contrast agents in the image field. The nonlinear characteristics are extracted and the linear fundamental components canceled by combining the echo signals in a chosen receive passband such as receive bands 30, 32 or 34 as shown in FIG. 5. The receive band can start at the higher frequency location 32 at the initial reception of shallow depth echoes, then be moved dynamically to the lower frequency position 34 during reception to account for the effects of depth dependent frequency attenuation. By virtue of the modulation of the transmit pulses and the nonlinearity of the reflectors the correlated linear characteristics in the fundamental band will cancel and the uncorrelated nonlinear characteristics in the fundamental band will not, leaving an echo signal component which is a measure of the nonlinearity of the fundamental frequency echoes. Thus, nonlinear components are detected which are below the second harmonic frequency.

The use of these nonlinear components below the second harmonic frequency provide several advantages. For one, most or even all of the transducer passband can be used for transmission. This enables the use of broadband transmit pulses which will result in broadband echo signals for finer and more subtle image detail. There is no need to constrain the transmit pulses to a narrow range of the transducer passband. Another advantage is that the transmit and receive passbands can both be more centered in the transducer passband, away from the rolloff at the extremes of the transducer passband. Higher transmit pulse frequencies and shorter duration pulse bursts may also be used, providing advantages in the form of reduced microbubble destruction.

Figure 6:
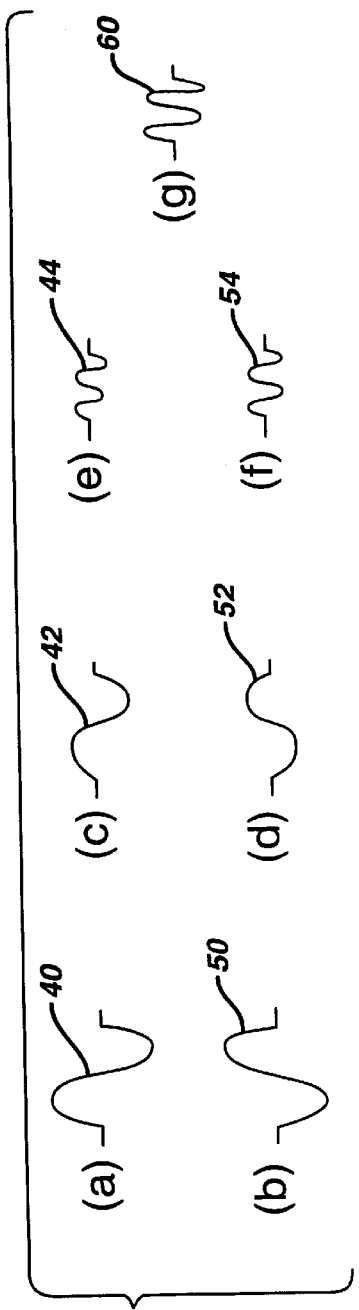
FIGS. 6a–6g depict waveforms illustrating the principle of pulse inversion harmonic separation.

FIG. 6 illustrates the principles of pulse inversion transmission and reception. A first transmit pulse 40 (FIG. 6a) has a first phase or polarity characteristic and a second transmit pulse 50 has an second phase or polarity characteristic (FIG. 6b). In this example both pulses are shown as a single cycle of a waveform and the second pulse 50 is the inverse of the first. The first transmit pulse 40 returns echo signals from a nonlinear system such as a microbubble which have a fundamental frequency component 42 (FIG. 6c) which follows the phase or polarity modulation of the transmit pulse, and a second harmonic component 44 (FIG. 6e). The second transmit pulse 50 returns echo signals from the nonlinear system which have a fundamental frequency component 52 (FIG. 6d) which also follows the phase or polarity of the transmit pulse, and a second harmonic component 54 (FIG. 6f). When the echo signals from the two transmit pulses are combined the fundamental frequency components will cancel each other and the harmonic components will additively reinforce each other by reason of the quadratic nature of harmonics, leaving a detectable second harmonic component 60 (FIG. 6g). Thus, the second harmonic components have been separated from the fundamental frequency components of the echo signals.

Figure 7:
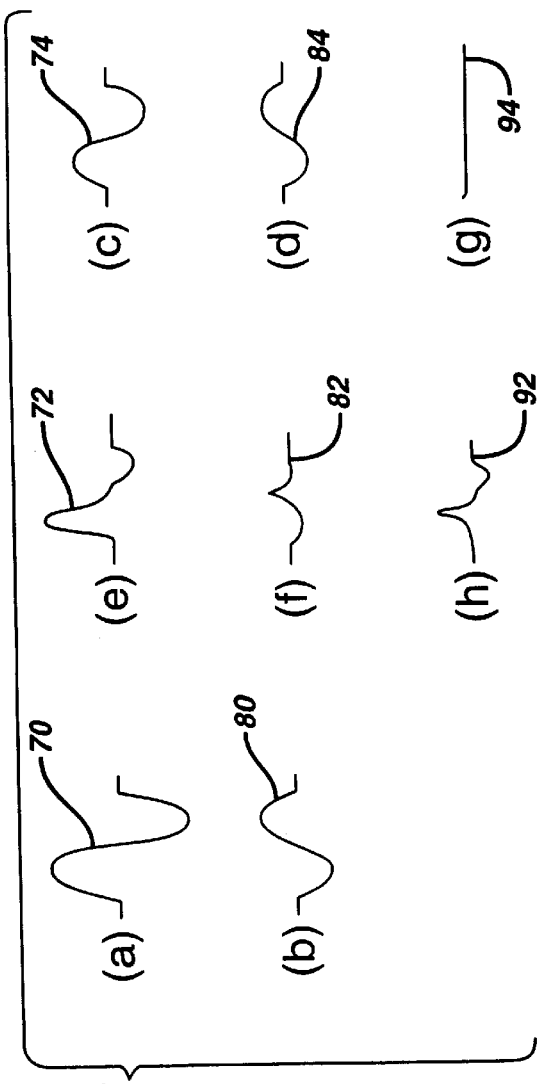
FIGS. 7a–7g depict waveforms illustrating the principle of nonlinear echo signal detection in the fundamental band in accordance with the principles of the present invention.

FIG. 7 shows waveforms illustrating the principles of the present invention. Like pulse inversion the technique of the present invention uses multiple, differently modulated transmit pulses to separate nonlinear signal components. FIGS. 7a and 7b show two exemplary transmit pulses 70 and 80 which are of different amplitudes. In this example the first transmit pulse 70 is twice the amplitude of the second transmit pulse 80, although other amplitude relationships may be employed. In this example the two transmit pulses are also of opposite phase or polarity. Transmit pulse 70 elicits different fundamental frequency echo signal characteristics from nonlinear and linear targets. For instance, if the echo is returned from a nonlinear contrast agent, the nonlinear behavior of the microbubbles when insonified will return a fundamental frequency echo waveform 72 as shown in FIG. 7e which is nonlinearly related to the transmit waveform. If the echo is returned from a linear reflector such as tissue, a fundamental frequency echo 74 as shown in FIG. 7c results, which is seen to be linearly related to the transmit pulse.

The second transmit pulse will elicit fundamental frequency echo returns from nonlinear and linear reflectors as shown in FIGS. 7f and 7d. A nonlinear system such as a microbubble will return an echo 82, which is nonlinearly related to the transmit waveform 80. Since the transmit pulse 80 is of a lesser amplitude than the first pulse, the microbubble will behave differently by reason of the different level of insonification. A linear reflector returns an echo 84 which is seen to be linearly related to the lesser amplitude transmit pulse 80.

The first and second echo signals are normalized to account for the different transmit pulse amplitudes. When the two transmit pulses differ by a factor of two as they do in this example, the echoes from the second pulse would be amplified by a factor of two, for instance. When the corresponding echoes are combined after normalization, it can be seen that the linear echoes will cancel as shown by line 94 in FIG. 7g. The echoes returned from the nonlinear reflectors will partially cancel but leave a difference which is a manifestation of the different nonlinearities of the echoes as shown by waveform 92 in FIG. 7h. That is because the nonlinear characteristics of echoes 72 and 82 are not equalized by the linear normalizing and will leave a residual signal after combining because of the decorrelation of the two nonlinear echo signals. The nonlinear effects in the echoes are not linearly related to the difference in pulse amplitude of the two transmit pulses. This means that the normalization, which will equalize the two linear echoes 74 and 84 and result in cancellation, will not equalize the echoes from the nonlinear reflectors. The oscillation of microbubbles when insonified by pulses of different amplitudes is nonlinear and more complex than just the amplitude difference. Furthermore, the microbubbles can be disrupted by the first pulse so that the microbubbles interrogated by the second pulse have a different character than those encountered by the first pulse. The combination of these different nonlinear and behavioral characteristics of a nonlinear system provide the ability to clearly distinguish echoes from nonlinear systems in the fundamental frequency band.

Figure 8:
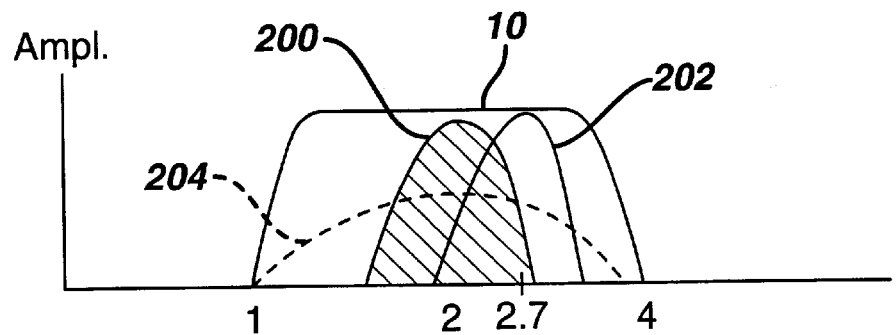
FIG. 8 illustrates the transmit and receive passbands of one embodiment of the present invention.

FIG. 8 illustrates the passbands of another embodiment of the present invention. The fundamental frequency transmit pulse band is shown by the lined passband 200 centered at 2 MHz. The receive band 202 is centered at 2.7 MHz and greatly overlaps the transmit passband to receive echoes in a portion of the received echo band 204. In the prior art great pains were taken to transmit pulses in a band which did not overlap the receive band so that the second harmonic signals could be cleanly separated from the fundamental frequency signals. In the present invention, where it is nonlinear components at and around the fundamental band which are of interest, this is not a problem.

Figure 9:
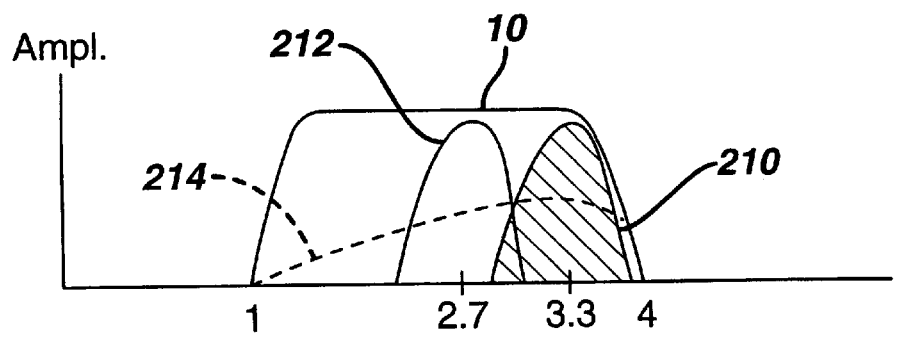
FIG. 9 illustrates the transmit and receive passbands of another embodiment of the present invention.

FIG. 9 illustrates yet another embodiment of the present invention where the receive band 212 is below the transmit pulse band 210. In this example the transmit band is a high frequency band centered about 3.3 MHz. The high frequency transmit signals result in better resolution in the echo signals. Locating the transmit band at the upper end of the transducer passband 10 obviously cannot be done when trying to contain both the fundamental and second harmonic bands in the transducer passband. Thus, the present invention will afford better image resolution than prior art harmonic systems. The receive band 212 encompasses some of the echo signal frequencies in the echo signal band 214 and is centered at 2.7 MHz in this embodiment.

Figure 9A:
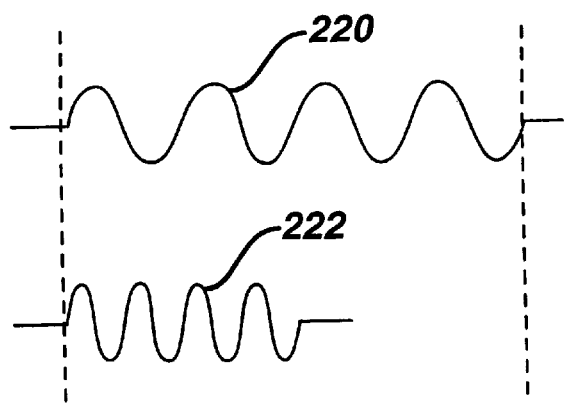

One of the desires when performing contrast imaging is to minimize the destruction of microbubbles caused by the ultrasonic insonification, so that the period of contrast imaging can be prolonged. Microbubbles can be disrupted and destroyed to a greater extent by lower frequency pulses, higher amplitude pulses, and longer pulse bursts. FIG. 9a compares four cycles of a 1.5 MHz transmit pulse 220 which was the transmit frequency used in the illustration of FIG. 2 with four cycles of a 3.3 MHz pulse 222 as used in FIG. 9. As these drawings show, the duration of the 3.3 MHz pulse is considerably less than that of the lower frequency burst, causing less microbubble disruption. The 3.3 MHz pulse, being of a higher frequency, will also cause less disruption than the lower frequency pulse for this additional reason. Furthermore, the lower amplitude transmit pulse (FIG. 7b) will cause less disruption than the higher amplitude transmit pulse. While the different amplitude pulses can be transmitted in either order, transmitting the lower amplitude pulse as the first pulse will cause less disruption to the microbubble field that is encountered by the second, higher amplitude pulse. The two transmit pulses can also differ in amplitude only or in phase or polarity only, but the combination of the two modulation differences, both amplitude and phase or polarity, provides better nonlinear decorrelation and thus better nonlinear sensitivity.

Figure 10:
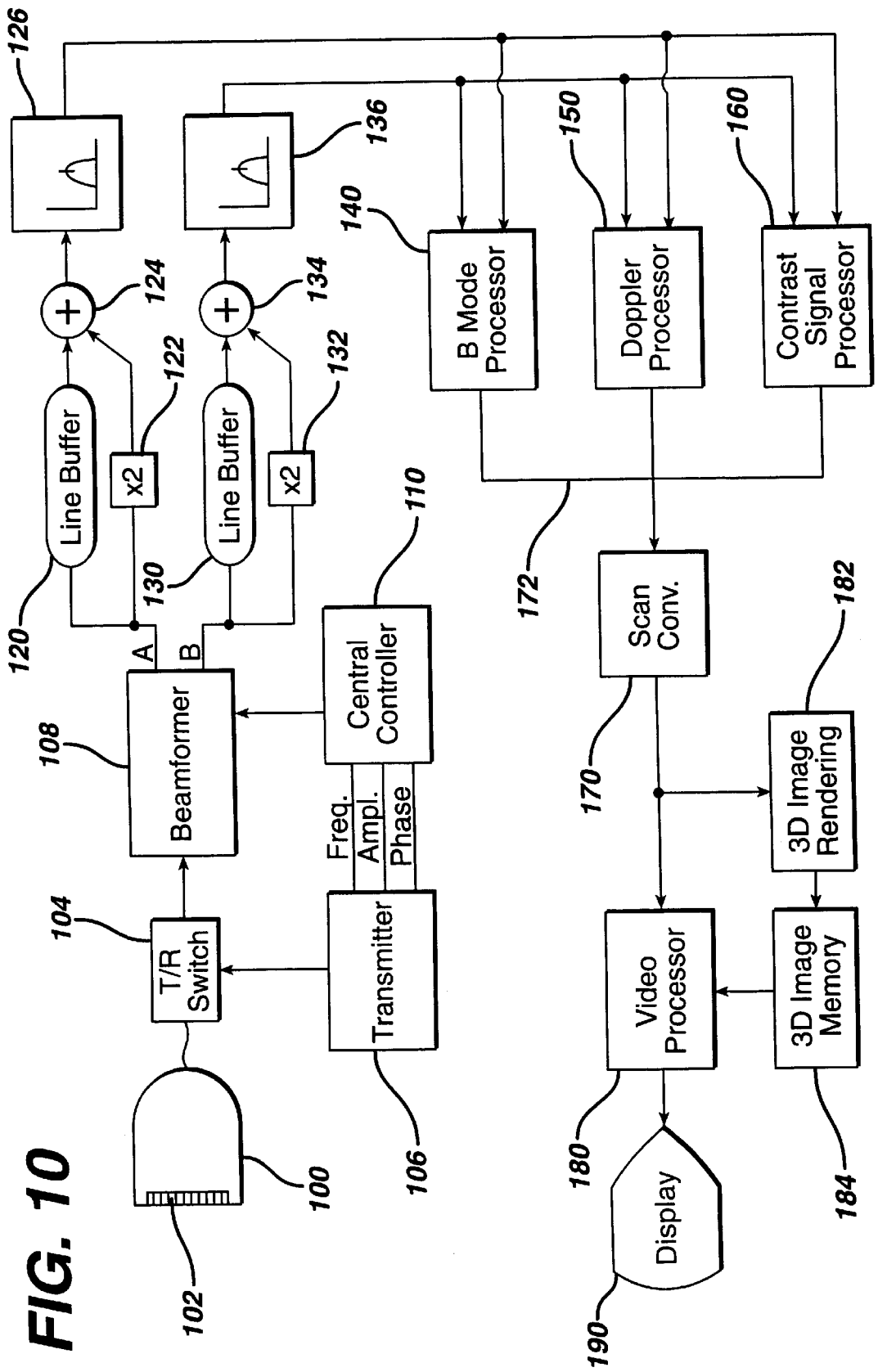
FIG. 10 illustrates an ultrasonic imaging system constructed in accordance with the principles of the present invention.

FIG. 10 illustrates an ultrasound system in block diagram form which is constructed in accordance with the principles of the present invention. An ultrasound scanhead 100 including an array transducer 102 is connected to a transmit/receive (T/R) switch 104. A central controller 110 responsive to a user interface (not shown) sets the frequency, amplitude, and phase or polarity of the transmit pulse. A transmitter 106 transmits the pulses set by the central controller by way of the T/R switch, exciting elements of the transducer array in a timed sequence to transmit appropriately steered and focused beams. The echoes received by the transducer array 102 are coupled by the T/R switch to a receive beamformer 108. In this example the beamformer is shown as a multiline beamformer which, under control of the central controller, produces two spatially adjacent receive lines of coherent echo signals A and B. The echo sequences produced in response to the first transmit pulse are stored in line buffers 120 and 130 for the A and B multilines, respectively. The echo sequences produced in response to the second transmit pulse, in this example a lower amplitude pulse, are multiplied by a factor of two in multiplier circuits 122 and 132 when the difference in amplitudes is a factor of two. The multipliers can be easily implemented for multiplication by two in a digital system by shifting the echo signal values one bit to the left to multiply by two (or one bit to the right to halve a signal which is twice the other signal amplitude). After this normalization the echo sequences are combined in summers 124 and 134 respectively to separate the nonlinear fundamental components. When these summers are set for subtraction the linear components will be emphasized for oppositely phased or poled transmit pulses. The echo signals are then filtered by filters 126 and 136. In a preferred embodiment these filters are quadrature bandpass filters as described in my aforementioned patent, to produce quadrature signal components and also bandpass filtering for the receive passband.

The echo signals may be processed by a B mode processor 140, a Doppler processor 150, and/or a contrast signal processor 160. The B mode processor will amplitude detect the echo signals in the production of image signals, and the Doppler processor will process ensembles of echo signals to produce image signals of tissue or flow motion. The contrast signal processor is similar to the previous processors, generally with a threshold which separates contrast harmonic signals from tissue harmonic signals. Contrast agents can be displayed in either Doppler or B mode format. Image signals from the three processors are coupled over an image signal bus 172 to a scan converter 170, which interpolates the image signals and puts the scanlines in the desired image format. The image information can be applied to a video processor 180 for display of a two dimensional image on a display 190. The image information can also be formed into three dimensional presentations by 3D image rendering 182. Three dimensional images are stored in a 3D image memory 184 and displayed on the display 190 by way of the video processor 180.

Other variations will be apparent. While the embodiment of FIG. 10 provides the obvious benefit of 2x multiline, which is a doubling of the scanline density or a halving of the framerate, these factors can be further improved by interpolation. For example, after transmitting two pulses of different modulation characteristics to produce two A line sequences of different characteristics and two B line sequences of different characteristics, an A line sequence of one characteristic can be combined with a B line sequence of the other characteristic to interpolate a further line of nonlinear or linear signals between the A and B lines. This could be done by combining the outputs of multiplier circuit 122 and line buffer 130 in an additional summer, for instance. By using more than two transmit pulses for a scanline motional effects can be reduced as explained in U.S. Pat. No. 6,186,950 entitled "Ultrasonic Pulse Inversion Harmonic Separation with Reduced Motional Effects", of which I am a co-inventor. The system of FIG. 10 can be used for continuous realtime contrast imaging as described in U.S. Pat. No. 6,171,246 entitled "Realtime Ultrasonic Imaging of Perfusion Using Ultrasonic Contrast Agents", of which I am a co-inventor. Embodiments of my invention can be used for detecting the nonlinear effects of numerous nonlinear reflectors, such a microbubble contrast agents and nonlinear effects due to pulse travel through tissue. The band selection performed by filters 126 and 136 can be omitted or performed by FIR filters or in the wall filter of the Doppler processor 150.

What is claimed is:

1. A method for nonlinear ultrasonic imaging comprising:
   transmitting a first pulse exhibiting frequencies in a fundamental frequency band to a target exhibiting a nonlinear response;

transmitting a second pulse exhibiting frequencies in the fundamental frequency band to the target, the second pulse being differently modulated in at least one of amplitude, phase or polarity;

receiving echoes from the target in response to each pulse which include a frequency included in the fundamental frequency band;

combining the echoes received in response to the pulses to produce signals in the fundamental frequency band embodying a nonlinear effect of the target; and using the nonlinear effect signals to produce an ultrasound image.

2. The method of claim 1, wherein transmitting comprises transmitting pulses which are differently amplitude modulated.

3. The method of claim 1, wherein transmitting comprises transmitting pulses which are differently modulated in phase or polarity.

4. The method of claim 1, wherein transmitting comprises transmitting pulses which are differently modulated in amplitude and in phase or polarity.

5. The method of claim 2, further comprising normalizing the received echoes to account for the amplitude modulation difference.

6. The method of claim 1, wherein receiving comprises receiving echoes from the target in a band of frequencies which include a frequency which is within the fundamental frequency band and a frequency which is above the fundamental frequency band.

7. The method of claim 1, wherein receiving comprises receiving echoes from the target in a band of frequencies which include a frequency which is within the fundamental frequency band and a frequency which is below the fundamental frequency band.

8. The method of claim 1, wherein receiving comprises receiving echoes from the target in a band of frequencies which declines in frequency from a higher frequency band to a lower frequency band with increasing depth, wherein said band includes a frequency which is within the fundamental frequency band during at least a portion of a period of echo reception.

9. The method of claim 1, wherein combining comprises canceling linear components of the received echoes and enhancing nonlinear components of the received echoes.

10. The method of claim 9, wherein combining further comprises utilizing the modulation difference of the transmitted pulses to cancel linear components of the received echoes.

11. The method of claim 1, wherein receiving comprises receiving echoes along at least two spatially distinct scanline directions in response to each act of transmitting.

12. The method of claim 2, wherein transmitting a first pulse comprises transmitting a pulse of a given amplitude, and wherein transmitting a second pulse comprises transmitting a pulse of an amplitude which is less than the given amplitude.

13. A method for nonlinear ultrasonic imaging comprising:

transmitting a plurality of pulses exhibiting frequencies in a fundamental frequency band to a target exhibiting a nonlinear response;

receiving echoes from the target in response to the transmitted pulses in frequency bands which overlap the fundamental frequency band;

identifying the nonlinear components of the received echoes which overlap the fundamental frequency band; and using the identified nonlinear signal components to produce an ultrasound image.

14. The method of claim 13, wherein transmitting further comprises insonifying the target with differently modulated transmit pulses; and wherein identifying comprises combining echoes received in response to differently modulated transmit pulses.

15. The method of claim 13, wherein transmitting comprises transmitting a plurality of pulses to a contrast agent; and wherein receiving comprises receiving echoes from the contrast agent.

* * * * *